US008427806B2

(12) United States Patent
Benson et al.

(10) Patent No.: US 8,427,806 B2
(45) Date of Patent: Apr. 23, 2013

(54) CONTROL SYSTEM AND METHOD FOR TRANSMISSION SOLENOIDS

(75) Inventors: Christopher G Benson, Rochester Hills, MI (US); Matthew R Malik, Highland, MI (US)

(73) Assignee: GM Global Technology Operations LLC

( * ) Notice: Subject to any disclaimer, the term of this patent is extended or adjusted under 35 U.S.C. 154(b) by 593 days.

(21) Appl. No.: 12/703,865

(22) Filed: Feb. 11, 2010

(65) Prior Publication Data

US 2011/0157758 A1 Jun. 30, 2011

Related U.S. Application Data

(60) Provisional application No. 61/290,751, filed on Dec. 29, 2009.

(51) Int. Cl.
*H01H 9/00* (2006.01)
*H01H 47/00* (2006.01)

(52) U.S. Cl.
USPC ............ 361/160; 361/170; 361/143; 361/144

(58) Field of Classification Search .................. 361/160, 361/170, 143, 144
See application file for complete search history.

(56) References Cited

U.S. PATENT DOCUMENTS

| | | | | |
|---|---|---|---|---|
| 5,951,616 A * | 9/1999 | Chiba et al. | ..................... | 701/58 |
| 6,328,674 B1 * | 12/2001 | Matsue et al. | ................ | 477/155 |
| 7,018,178 B2 * | 3/2006 | Hunter et al. | ................. | 417/219 |
| 7,181,330 B2 * | 2/2007 | Shimojo et al. | ............... | 701/102 |
| 7,192,005 B2 * | 3/2007 | Denyer et al. | ............ | 251/129.08 |
| 7,723,946 B2 * | 5/2010 | Welchko et al. | .............. | 318/811 |

\* cited by examiner

*Primary Examiner* — Stephen W Jackson
*Assistant Examiner* — Zeev V Kitov

(57) ABSTRACT

A current control output (CCO) system for transmission solenoids includes a current determination module, a current compensation module, and a current control module. The current determination module determines a desired current for the solenoids based on a desired pressure. The current compensation module generates a compensated current by adjusting the desired current based on a system pressure and a temperature of oil in the transmission. The current control module performs current-based control of and applies hysteresis to the solenoids based on the compensated current.

20 Claims, 8 Drawing Sheets

Current Determination Table
(Increasing Pressure)

| Pressure Axis (kPa) — Unique to Manufacturer | | | | | | | | | | | | | | | | | | | | Current Axis (%) — Common |
|---|---|---|---|---|---|---|---|---|---|---|---|---|---|---|---|---|---|---|---|---|
| 0 | 45 | 90 | 135 | 180 | 225 | 270 | 315 | 360 | 405 | 450 | 495 | 540 | 585 | 630 | 675 | 720 | 765 | 810 | 855 | 900 |
| 1.0 | 0.95 | 0.9 | 0.85 | 0.8 | 0.75 | 0.7 | 0.65 | 0.6 | 0.55 | 0.5 | 0.45 | 0.4 | 0.35 | 0.3 | 0.25 | 0.2 | 0.15 | 0.1 | 0.05 | 0.0 |

Current Determination Table
(Decreasing Pressure)

| Pressure Axis (kPa) — Unique to Manufacturer | | | | | | | | | | | | | | | | | | | | Current Axis (%) — Common |
|---|---|---|---|---|---|---|---|---|---|---|---|---|---|---|---|---|---|---|---|---|
| 0 | 42 | 93 | 132 | 183 | 222 | 273 | 312 | 363 | 402 | 453 | 492 | 543 | 582 | 633 | 672 | 723 | 762 | 813 | 852 | 903 |
| 1.0 | 0.95 | 0.9 | 0.85 | 0.8 | 0.75 | 0.7 | 0.65 | 0.6 | 0.55 | 0.5 | 0.45 | 0.4 | 0.35 | 0.3 | 0.25 | 0.2 | 0.15 | 0.1 | 0.05 | 0.0 |

FIG. 5A

Current Adjustment Table

| Oil Temperature Axis (°C) \ Determined Current Axis (%) | 0 | .05 | .1 | .15 | .20 | .25 | .30 | .35 | .40 | .45 | .50 | .55 | .60 | .65 | .70 | .75 | .80 | .85 | .90 | .95 | 1.0 |
|---|---|---|---|---|---|---|---|---|---|---|---|---|---|---|---|---|---|---|---|---|---|
| -40 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| -20 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 20 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 40 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 60 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 80 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 100 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 120 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 140 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |

Oil Temperature Axis (°C) — Common
Determined Current Axis (%) — Common
Current Offset (%) Unique to Manufacturer

FIG. 5B

Current Transformation Table

| Supply Pressure Axis (kPa) | Pressure Step Magnitude Axis (kPa) | | | | |
|---|---|---|---|---|---|
| | -80 | -40 | 0 | 40 | 80 |
| 345 | -500 | -250 | 0 | 250 | 500 |
| 482 | -500 | -250 | 0 | 250 | 500 |
| 627 | -500 | -250 | 0 | 250 | 500 |
| 758 | -500 | -250 | 0 | 250 | 500 |
| 896 | -500 | -250 | 0 | 250 | 500 |

Hysteresis Gain

FIG. 5C

CONTROL SYSTEM AND METHOD FOR TRANSMISSION SOLENOIDS

CROSS-REFERENCE TO RELATED APPLICATIONS

This application claims the benefit of U.S. Provisional Application No. 61/290,751, filed on Dec. 29, 2009. The disclosure of the above application is incorporated herein by reference in its entirety.

FIELD

The present disclosure relates to transmission control systems and more particularly to a current control compensation system and method for solenoids transmissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons that rotatably turn a crankshaft generating drive torque. The drive torque may be transferred to a driveline of a vehicle (e.g., wheels) via a transmission. The drive torque may also be translated (i.e., multiplied) by one of a plurality of gear ratios of the transmission. The transmission may be coupled to the crankshaft via a torque converter (e.g., a fluid coupling). The transmission includes a plurality of components such as solenoid valves, clutches, and one or more planetary gearsets.

The solenoid valves may each include a solenoid and a valve. More specifically, the solenoid may convert electrical energy (e.g., current from a controller) into mechanical energy that opens or closes the valve mechanically. The transmission may also include servos that actuate one or more of the clutches. The clutches may engage one or more gears of the planetary gearsets.

The transmission also includes hydraulic fluid that controls one or more of the components. The hydraulic fluid is typically supplied to the transmission from a main pump. The transmission may include pressure control solenoids, shift solenoids, and/or flow control solenoids. The pressure control solenoids and the flow control solenoids control the pressure and flow of hydraulic fluid in the transmission, respectively. The shift solenoids, on the other hand, control components of the transmission (servos, clutches, gears, etc.) based on a pressure of the hydraulic fluid.

SUMMARY

A current control output (CCO) system for transmission solenoids includes a current determination module, a current compensation module, and a current control module. The current determination module determines a desired current for the solenoids based on a desired pressure. The current compensation module generates a compensated current by adjusting the desired current based on a system pressure and a temperature of oil in the transmission. The current control module performs current-based control of and applies hysteresis to the solenoids based on the compensated current.

A current control method for transmission solenoids includes determining a desired current for the solenoids based on a desired pressure, generating a compensated current by adjusting the desired current based on a system pressure and a temperature of oil in the transmission, and performing current-based control of and applying hysteresis to the solenoids based on the compensated current.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 5A-5C illustrate exemplary lookup tables according to the present disclosure.

DETAILED DESCRIPTION

Figure 1:
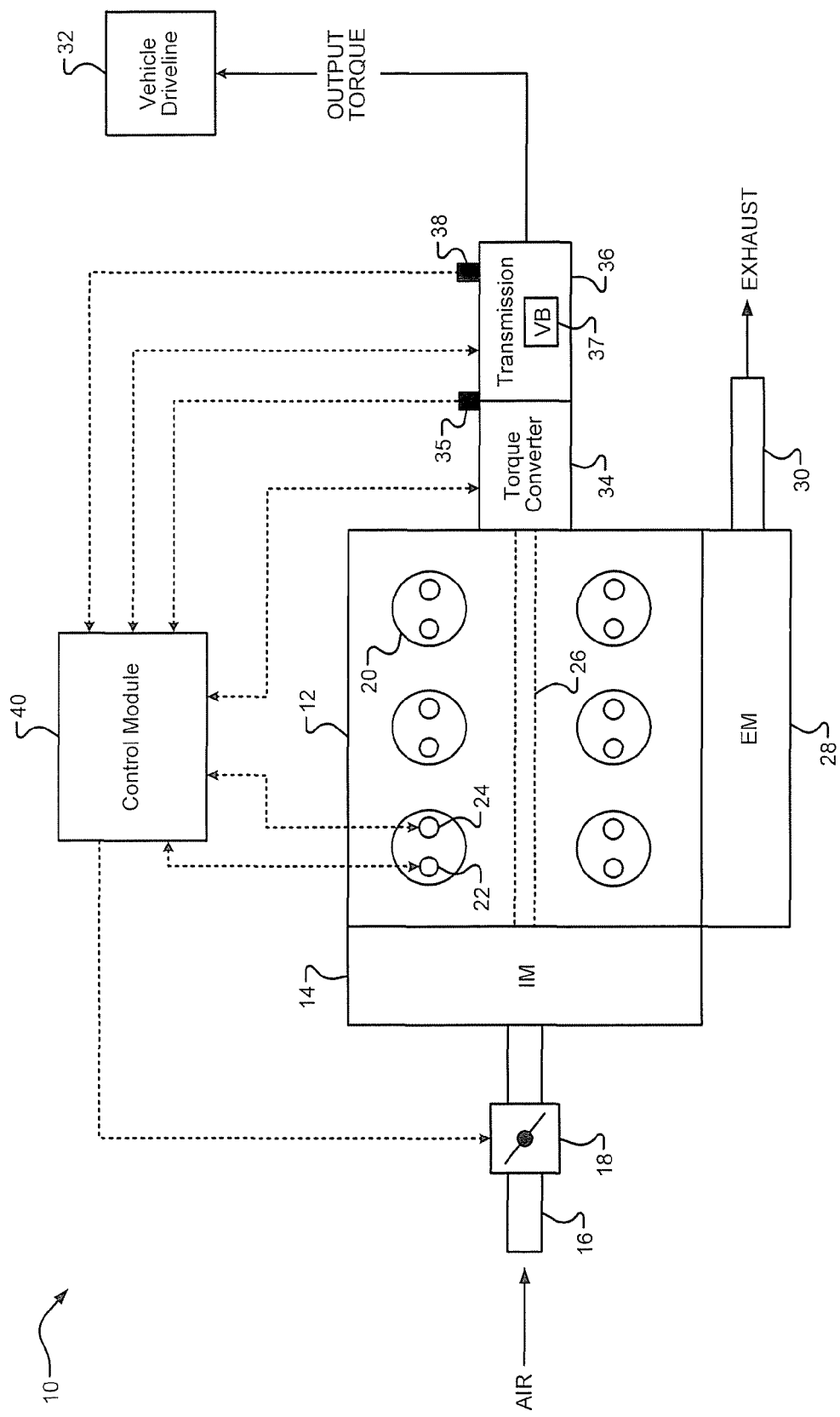
FIG. 1 is a functional block diagram of an exemplary powertrain system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Transmissions may include pressure control solenoids, shift solenoids, and flow control solenoids. The pressure control solenoids and flow control solenoids control the pressure and flow of hydraulic fluid in the transmission, respectively. The shift solenoids, on the other hand, control various components of the transmission to achieve a desired gear ratio. The shift solenoids, however, may also be used for precise pressure control during gear shifts ("shift pressure").

Precise pressure control may improve a quality of the shift and/or a speed of the shift. Rather, too high of a shift pressure may result in rough shifting and too low of a shift pressure may cause clutches to overheat. Thus, employing a current control output (CCO) based control strategy may improve the accuracy of the shift pressure control, thus improving the shift quality and/or the shift speed. Conventional transmission control systems may control the magnitude of current supplied to solenoids in a transmission according to one of a plurality of predetermined currents (i.e., manufacturer specific).

Therefore, a control system and method is presented that controls the amount of current supplied to solenoids in a transmission to improve shift pressure control. More specifically, the control system and method determine a desired current to supply the solenoids based on a desired shift pressure. Additionally or alternatively, the control system and method may determine the desired current based on a magnitude and a polarity of a difference between the desired pressure and a previous pressure. The control system and method may then generate a compensated current by adjusting the determined current based on system pressure and transmission oil temperature. Additionally or alternatively, the control system and method may generate the compensated current by adjusting the determined current based on the magnitude and the polarity of the difference between the desired pressure and the previous pressure. The control system and method may then transform the compensated current by applying an offset to compensate for hysteresis. Finally, the control system and method may perform CCO of the solenoids based on the transformed (and compensated) current, a commanded dither frequency, and a commanded dither amplitude.

Moreover, the control system and method may include lookup tables for determining the current, generated compensated current, and transforming the compensated current. The lookup tables may include both common elements and manufacturer-specific elements. In other words, each manufacturer of a transmission may determine parameters for each of the lookup tables corresponding to a predetermined set of values. Therefore, the control system and method may be implemented with different transmissions from multiple manufacturers.

Referring now to FIG. 1, a powertrain system 10 includes an engine 12. The engine 12 draws air into an intake manifold 14 through an inlet 16 that may be regulated by a throttle 18. The air in the intake manifold 14 may be distributed to a plurality of cylinders 20. While six cylinders are shown, the engine 12 may include other numbers of cylinders. The air distributed to the cylinders 20 may be mixed with fuel from a plurality of fuel injectors 22 to create an air/fuel (A/F) mixture. For example, the fuel injectors 22 may inject fuel into intake ports of the cylinders 20, respectively (i.e., port fuel injection). Alternatively, the fuel injectors 22 may inject fuel directly into the cylinders 20, respectively (i.e., direct fuel injection).

The A/F mixture in the cylinders 20 may be compressed by pistons (not shown) and ignited by spark from a plurality of spark plugs 24, respectively (i.e., spark ignition combustion). Additionally or alternatively, the A/F mixture may be compressed until a critical temperature and/or pressure is reached resulting in automatic ignition (i.e., homogeneous charge compression ignition, or HCCI combustion, or compression ignition combustion, such as a diesel engine). The combustion of the A/F mixture in the cylinders 20 drives pistons (not shown) which rotatably turn a crankshaft 26 generating drive torque. Exhaust gas resulting from combustion is expelled from the cylinders 20 of the engine 12 through an exhaust manifold 28. The exhaust gas may be treated by an exhaust treatment system 30 to reduce emissions before being released into the atmosphere.

The generated drive torque may be transferred from the crankshaft 26 to a vehicle driveline 32 (e.g., wheels) via a torque converter 34 and/or a transmission 36. In other words, the torque converter 34 may couple the crankshaft 26 to the transmission 36. For example, the torque converter 34 may include a hydraulic fluid coupling and the transmission 36 may include one of a hydraulic transmission and a dual dry clutch transmission (DCT). The transmission 36, however, may also be a different type of transmission. A pressure sensor 35 may measure pressure of hydraulic fluid in the torque converter 34. Additionally, the pressure sensor 35 may measure pressure of hydraulic fluid in the transmission 36 (i.e., when the torque converter 34 supplied hydraulic fluid to the transmission 36).

The transmission 36 may include one or more planetary gearsets for achieving a desired gear ratio. A valve body (VB) 37 in the transmission 36 may include a plurality of solenoid valves that control the flow of hydraulic fluid to actuate various components of the transmission 36. For example, the various components of the transmission 36 may include, but are not limited to clutches, servos, switches, etc. The transmission 36 may multiply the drive torque from the crankshaft 26 (via torque converter 34) by the desired gear ratio and output the multiplied drive torque to the vehicle driveline 32. An oil temperature sensor 38 may measure a temperature of oil in the transmission 36. For example, the oil temperature sensor 38 may measure a temperature of oil located in a lubricant sump (not shown) of the transmission 36. The transmission 36 may also include other temperature and/or hydraulic fluid pressure sensors.

A control module 40 controls operation of the powertrain system 10. While one control module 40 is shown, more than one control module may be implemented. For example, separate control modules may be implemented for powertrain (i.e., engine) control and transmission control, respectively. The control module 40 may control the throttle 18, the fuel injectors 22, the spark plugs 24, the torque converter 34, and the transmission 36 (including the valve body 37). The control module 40, however, may also control other components of the powertrain system 10. The control module 40 may also receive signals from the pressure sensor 35 and the oil temperature sensor 38. The control module 40, however, may also receive signals (i.e., measurements) from other sensors indicating various other powertrain operating parameters. The control module 40 may also implement the control system and/or method of the present disclosure.

Figure 2:
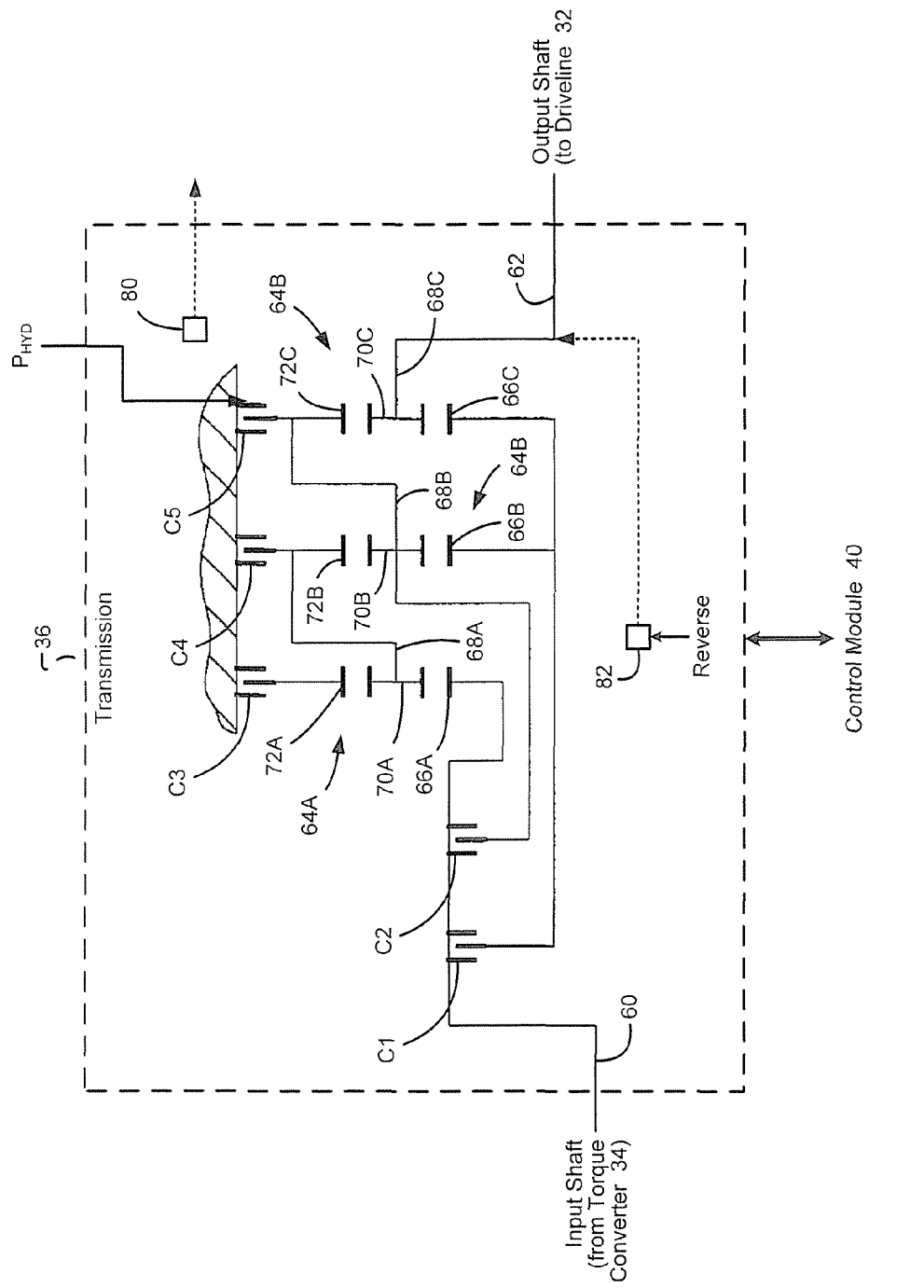
FIG. 2 is a schematic of an exemplary transmission according to the present disclosure.

Referring now to FIG. 2, the transmission 36 is shown in more detail. For example, the transmission 36 may be a six-speed automatic transmission as shown. However, it can be appreciated that various other transmissions may also be implemented, such as different types of transmissions and transmissions that include different numbers of gears. For example only, the transmission may be a dual clutch transmission. The transmission 36 may also communicate with the control module 40.

The transmission 36 includes an input shaft 60, an output shaft 62 and three interconnected planetary gear sets 64A, 64B and 64C, respectively. For example, the input shaft 60 may be driven by a turbine (not shown) of the torque converter 34. The planetary gear sets 64A, 64B, and 64C include respective sun gears 66A, 66B, and 66O, carriers 68A, 688, and 68C, planetary gears 70A, 70B, and 70C and ring gears 72A, 72B, and 72C.

The transmission 36 further includes clutches C1-C5 that are selectively engaged to establish a desired gear ratio of the transmission 36. More specifically, the input shaft 60 continuously drives the sun gear 66A of the gear set 64A, selectively drives the sun gears 66B, 66C of the gear sets 64B, 64C via the clutch C1 and selectively drives the carrier 68B of the gear set 64B via the clutch C2. The ring gears 72A, 72B, and 72C of the gear sets 64A, 64B, and 64C are selectively grounded via the clutches C3, C4 and C5, respectively.

Hydraulic pressure ($P_{HYD}$) is selectively provided to the various clutches to regulate engagement of the clutches. In other words, the pressure $P_{HYD}$ may allow the hydraulic fluid to flow through particular valves of the valve body 37 and engage corresponding clutches. A pressure switch 80 may be associated with the pressure line to each clutch and switches between ON and OFF states. More specifically, when $P_{HYD}$ is below a threshold pressure ($P_{THR}$), the switch is in the OFF state. When $P_{HYD}$ is greater than $P_{THR}$, the switch state is ON.

As diagrammed in Table 1 below, the state of the clutches C1-C5 (i.e., engaged or disengaged) may be controlled to provide six forward speed ratios (1, 2, 3, 4, 5, and 6), a reverse speed ratio (R), or a neutral condition (N).

TABLE 1

|         | C1 | C2 | C3 | C4 | C5 |
|---------|----|----|----|----|----|
| $1^{st}$ | X  |    |    |    | X  |
| $2^{nd}$ | X  |    |    | X  |    |
| $3^{rd}$ | X  |    | X  |    |    |
| $4^{th}$ | X  | X  |    |    |    |
| $5^{th}$ |    | X  | X  |    |    |
| $6^{th}$ |    | X  |    | X  |    |
| R       |    |    | X  |    | X  |
| N       |    |    |    |    | X  |

For example, the second forward speed ratio (i.e. $2^{nd}$ gear) is established when clutches C1 and C4 are engaged. Shifting from one speed forward speed ratio to another may generally be achieved by disengaging one clutch (i.e., the off-going clutch) while engaging another clutch (i.e., the on-coming clutch). For example, the transmission 36 may be downshifted from second gear to first gear by disengaging clutch C4 while engaging clutch C5.

Additionally, a reverse pressure switch (RPS) 82 may transition between enablement of the forward speed ratios 1-6 and the reverse speed ratio R. In other words, for example, the RPS 82 may be in an ON state to enable the reverse speed ratio R and thus propel the vehicle backwards. Thus, the RPS 82 may reverse a rotational direction of the output shaft 62. For example, the RPS 82 may be controlled via input from a driver (e.g., a shift lever) and/or via the control module 40.

Figure 3:
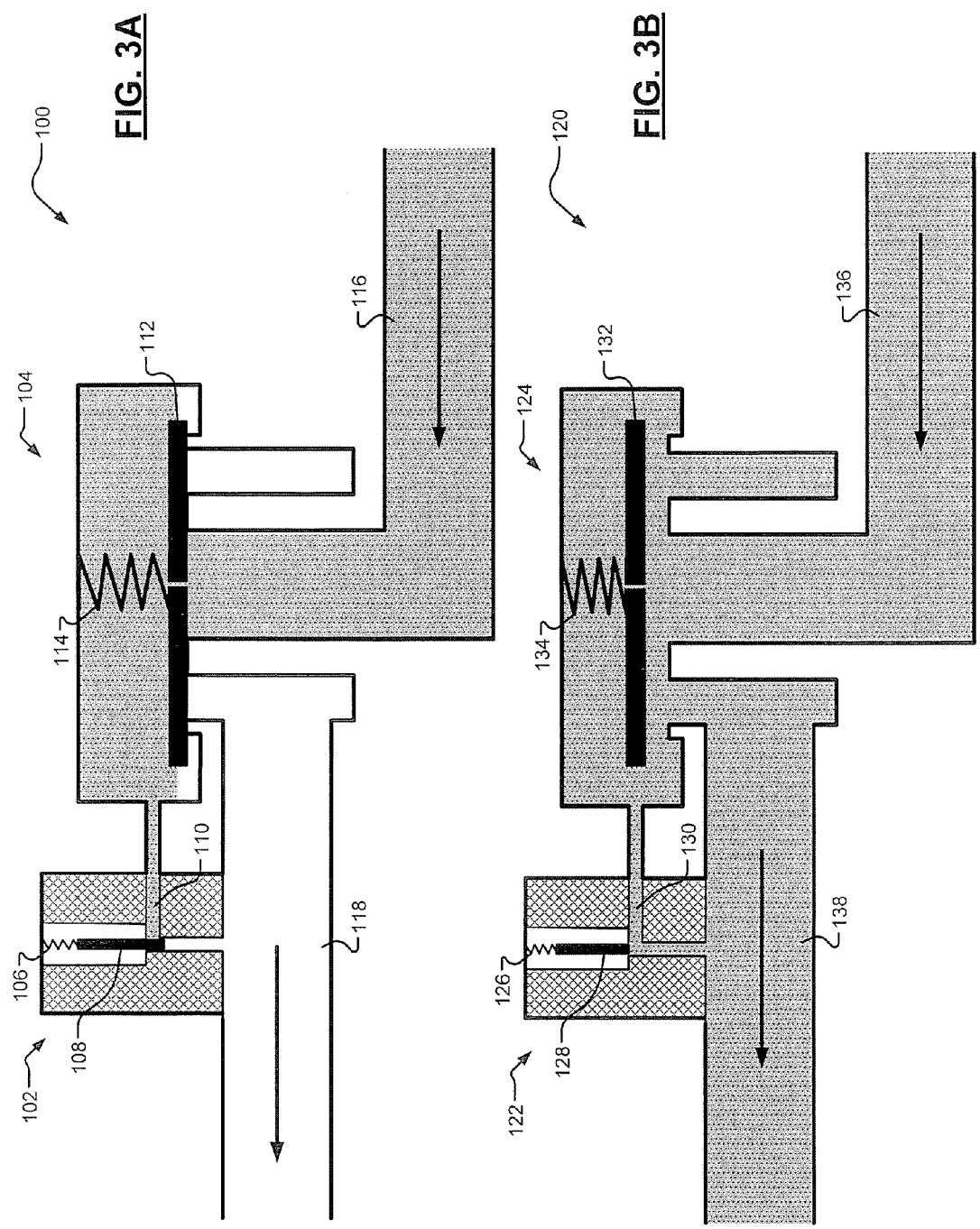
FIGS. 3A-3B are schematics of exemplary solenoid valves according to the present disclosure.

Referring now to FIGS. 3A and 3B, solenoid valves of the transmission 36 are shown in more detail. While diaphragm piloted solenoid valves are shown, other types of solenoid valves may be implemented in the transmission 36. FIG. 3A illustrates a solenoid valve 100 in a closed ("off") state. The solenoid valve 100 may include a solenoid 102, a valve 104, a pressure relief conduit 110, an inlet 116, and an outlet 118. More specifically, the solenoid 102 may control the flow of hydraulic fluid through the pressure relief conduit 110, thereby controlling the flow of hydraulic fluid from the inlet 116 to the outlet 118.

The solenoid 102 further includes a coil 106 and a stopper 108. More specifically, the coil 106 may receive current that creates a magnetic field and thus control the stopper 108. In other words, the coil 106 may not receive current ("de-energized"), thus leaving the stopper 108 in place blocking the flow of hydraulic fluid through the pressure relief conduit 110. The valve 104 further includes a stopper 112 and a spring 114. More specifically, the spring 114 holds the stopper 112 in place to seal and prevent the flow of hydraulic fluid from the inlet 116 to the outlet 118.

FIG. 3B, on the other hand, illustrates a solenoid valve 120 in an open ("on") state. The solenoid valve 120 may include a solenoid 122, a valve 124, a pressure relief conduit 130, an inlet 136, and an outlet 138. More specifically, the solenoid 122 may control the flow of hydraulic fluid through the pressure relief conduit 130, thereby controlling the flow of hydraulic fluid from the inlet 136 to the outlet 138.

The solenoid 122 further includes a coil 126 and a stopper 128. More specifically, the coil 126 may receive current that creates a magnetic field and thus control the stopper 128. In other words, the coil 126 may receive current ("energized") that creates a magnetic field. The magnetic field may move the stopper 128 and allow hydraulic fluid to flow through pressure relief conduit 130. The valve 124 further includes a stopper 132 and a spring 134. More specifically, the spring 134 holds the stopper 132 in place to seal and prevent the flow of hydraulic fluid from the inlet 136 to the outlet 138. However, when the solenoid is energized, pressure against the stopper 132 may be relieved thus releasing the seal. Therefore, hydraulic fluid may flow from the inlet 136 to the outlet 138 while the spring 134 is compressed and the stopper 132 is not sealing the inlet 136.

Figure 4:
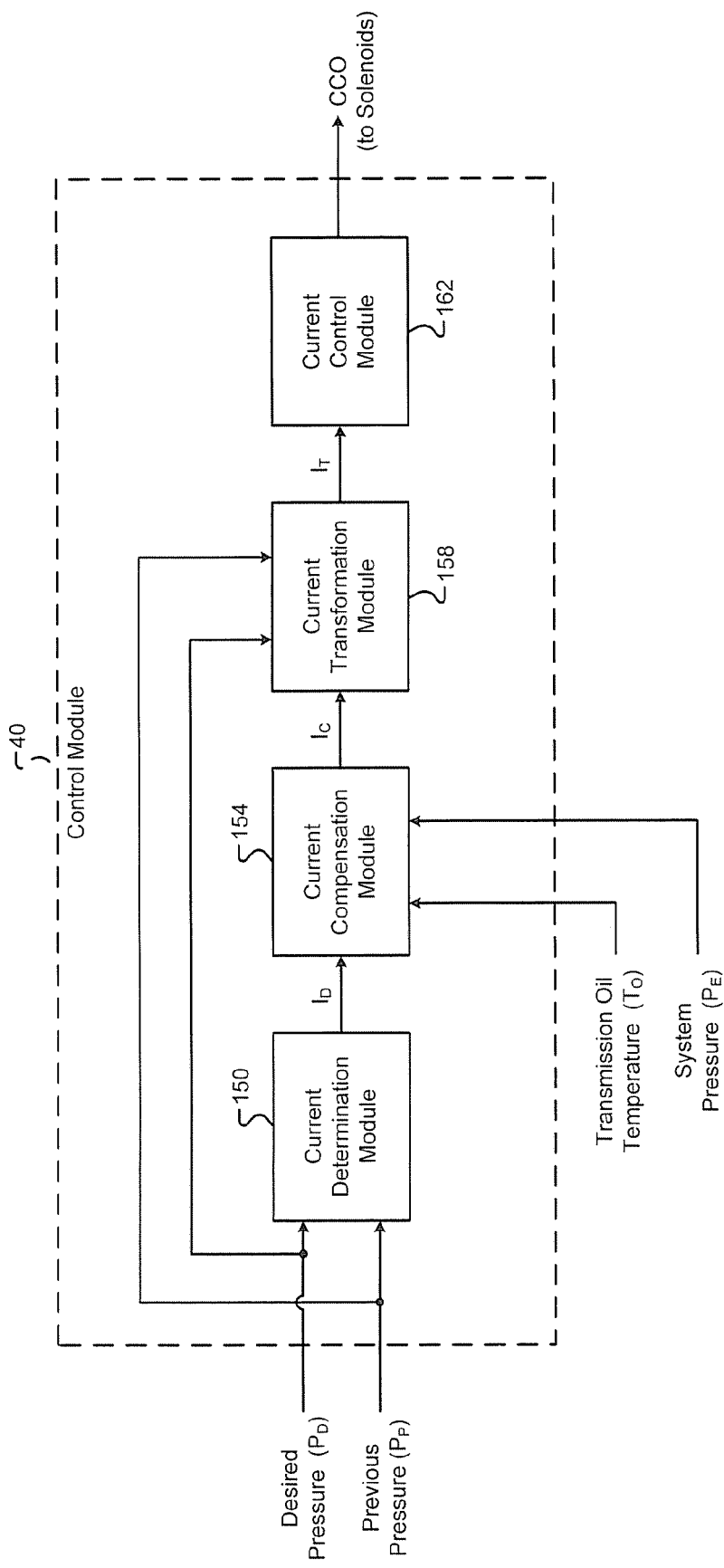
FIG. 4 is a functional block diagram of an exemplary control module according to the present disclosure.

Referring now to FIG. 4, the control module 40 is shown in more detail. The control module 40 may include a current determination module 150, a current compensation module 154, a current transformation module 158, and a current control module 162. The various pressures referred to hereinafter (e.g., $P_D$, $P_P$, and $P_E$) may refer to pressures of hydraulic fluid in the transmission 36. These elements are the primary components of the current control output (CCO) control system.

The current determination module 150 receives a desired pressure ($P_D$) and a previous pressure ($P_P$). For example, the desired pressure $P_D$ may be calculated using one or more pressure models. Additionally, for example, the previous pressure $P_P$ may include a desired pressure $P_D$ from a previous control cycle. The current determination module 150 may determine a desired current ($I_D$) to supply to solenoids of the transmission 36 based on the desired pressure $P_D$. Accordingly, the current determination module 150 may include one or more lookup tables that each include a plurality of desired currents $I_D$ relating to various desired pressures $P_D$. For example only, the current determination module 150 may include two lookup tables relating to increasing desired current $I_D$ and decreasing desired current $I_D$, respectively. Thus, additionally or alternatively the current determination module 150 may determine the desired current $I_D$ based on a magnitude and a polarity of a difference between the desired pressure $P_D$ and the previous pressure $P_P$. For example, the polarity of the difference between the previous pressure $P_P$ and the desired pressure $P_D$ may be used to determine whether the pressure is increasing or decreasing ("direction"). The direction of the pressure step (i.e., increasing or decreasing) may change based on various operating conditions. For example, a downshift operation may be aborted (and thus the direction may change) when the driver briefly depresses the accelerator to pass another vehicle, but then changes his mind and stops depressing the accelerator.

FIG. 5A illustrates exemplary lookup tables of the current determination module 150. More specifically, exemplary lookup tables are shown for both increasing pressure and decreasing pressure. Thus, the increasing pressure table may be used when the desired pressure $P_D$ is greater than the previous pressure $P_P$. Alternatively, the decreasing pressure table may be used when the previous pressure $P_P$ is greater than the desired pressure $P_D$.

A first axis of each of the tables may correspond to various desired pressures $P_D$. For example, the desired pressures $P_D$ may be measured in units of kilopascals (kPa). The various desired pressures $P_D$ may correspond to a second axis that includes various predetermined current values. In other words, the predetermined current values may be common across different implementations. For example, the current may be a percentage (e.g., ranging from 0% to 100%, or 0.0 to 1.0) of a maximum providable current. The various desired pressures $P_D$, on the other hand, may depend on specific parameters from a manufacturer of the transmission 36 (or more specifically, the valve body 37). Thus, a manufacturer may determine the various desired pressures $P_D$ that correspond to each of the predetermined current values. Therefore, the control system and method of the present disclosure may be implemented using different transmissions from multiple manufacturers.

Referring again to FIG. 4, the current compensation module 154 receives the desired current $I_D$ from the current determination module 150. The current compensation module 154 may also receive the system pressure ($P_E$) and a transmission oil temperature ($T_O$). For example, the system pressure $P_E$ may be estimated. The system pressure $P_E$, however, may be measured using a pressure transducer in the transmission (e.g., pressure sensor 35). The transmission oil temperature $T_O$, on the other hand, may be determined based on one or more temperature models. Alternatively, however, the transmission oil temperature $T_O$ may be measured using the transmission oil temperature sensor 38.

The current compensation module 154 generates a compensated current $I_C$ by adjusting the desired current $I_D$ based on the system pressure $P_E$ and the transmission oil temperature $T_O$. For example, the compensated current $I_C$ may include a sum of the desired current $I_D$ and a current adjustment corresponding to the estimated pressure $P_E$ and the transmission oil temperature $T_O$. Accordingly, the current compensation module 154 may include a lookup table that includes a plurality of compensated currents $I_C$ relating to various desired currents $I_D$, system pressures $P_E$, and transmission oil temperatures $T_O$. Additionally or alternatively, the current compensation module 154 may generate the compensated current $I_C$ by adjusting the desired current $I_D$ based on the magnitude and the polarity of the difference between the desired pressure $P_D$ and the previous pressure $P_P$.

FIG. 5B illustrates an exemplary lookup table of the current compensation module 154. More specifically, an exemplary lookup table is shown corresponding to a specific system pressure $P_E$. In other words, a plurality of lookup tables may be used according to the system pressure $P_E$. For example only, the current compensation module 154 may include five lookup tables corresponding to the following pressure characterization points, respectively: 345 kPa, 482 kPa, 627 kPa, 758 kPa, and 896 kPa. Moreover, a linear interpolation may be performed within one of the lookup tables to determine the offset current. This operation performs a current adjustment based on transmission oil temperature $T_O$. Furthermore, for example only, an average (or weighted average) of offset currents from two or more of the lookups tables may be calculated to determine the offset current corresponding to a particular predicted pressure $P_P$ (i.e., not one of the pressure characterization points). This operation performs a current adjustment based on system pressure $P_E$.

A first axis of each of the tables may correspond to various determined currents. For example, the determined currents may each be a percentage (e.g., ranging from 0% to 100%, or 0.0 to 1.0) of a maximum providable current. A second axis of each of the tables may correspond to various transmission oil temperatures $T_O$. For example only, the transmission oil temperatures $T_O$ may range from −40° Celsius (C) to 150° C. The various determined currents and the various transmission oil temperatures $T_O$ may be predetermined values that are common across different implementations.

The current adjustments, on the other hand, may depend on specific parameters from a manufacturer of the transmission 36 (or more specifically, the valve body 37). Thus, a manufacturer may determine the various current adjustments that correspond to each of the predetermined currents and transmission oil temperatures $T_O$. Therefore, the control system and method of the present disclosure may be implemented using different transmissions from multiple manufacturers. While current adjustments of 0.0 are shown for exemplary purposes only, the current adjustments may include one of a plurality of values in a predetermined range. For example only, the current adjustments may range from −100% (i.e., a compensated current $I_C$ of 0.0) to 100% (i.e., a compensated current $I_C$ of double the desired current $I_D$).

Referring again to FIG. 4, the current transformation module 158 receives the compensated current $I_C$ from the current compensation module 154. The current transformation module 158 may also receive the desired pressure $P_D$ and the previous pressure $P_P$.

The current transformation module 158 transforms the compensated current $I_C$ based on the desired pressure $P_D$ and the previous pressure $P_P$. More specifically, the current transformation module 158 may include a lookup table that includes various hysteresis gain values relating to various desired pressures $P_D$ and a pressure step ($P_S$). In other words, the pressure step $P_S$ may include a difference between the desired pressure $P_D$ and the previous pressure $P_P$. Thus, the magnitude of the pressure step $P_S$ may indicate a pressure step size and the polarity of the pressure step $P_S$ may indicate a direction (i.e., pressure change along a pressure vs. current curve).

The, the current transformation module 158 may generate a transformed current ($I_T$) based on the compensated current $I_C$ and the determined hysteresis gain. More specifically, the current transformation module 158 may apply a predetermined hysteresis to the compensated current $I_C$ according to the determined hysteresis gain to generate the transformed current $I_T$. Alternatively, however, the current transformation module 158 may determine the hysteresis gain and send the hysteresis gain to the current control module 162. The current control module 162 may then apply hysteresis to the compensated current $I_C$ according to the determined hysteresis gain during CCO of the solenoids in the transmission 36.

FIG. 5C illustrates an exemplary lookup table of the current transformation module 158. A first axis of the table may correspond to various desired pressures $P_D$. For example only, the desired pressures $P_D$ may include the pressure characterization points: 345 kPa, 482 kPa, 627 kPa, 758 kPa, and 896 kPa. A second axis of the table may correspond to various pressure step magnitudes $P_S$. In other words, the pressure step magnitude $P_S$ may include a difference between the desired pressure $P_D$ and the previous pressure $P_P$. For example, the various pressure step magnitudes $P_S$ may vary within a predetermined range. For example only, the predetermined range may be −80 kPa to 80 kPa. The various desired pressures $P_D$ and the various pressure step magnitudes $P_S$ may be unique to a particular transmission and thus supplied by the manufacturer. However, the various pressure step magnitudes $P_S$ may also be common across different implementations.

The table may include a plurality of hysteresis gain values relating to the various desired pressures $P_D$ and the various pressure step magnitudes $P_S$. Specifically, the hysteresis gain values may increase when the pressure step magnitude $P_S$ increases. Accordingly, the hysteresis gain values may vary from a first value corresponding to a lowest pressure step magnitude $P_S$ to a second value corresponding to a highest pressure step magnitude $P_S$. For example only, the hysteresis gain values may range from −500 to 500.

Referring again to FIG. 4, the current control module 162 receives the transformed current $I_T$ from the current transformation module 158. Alternatively, as previously described, the current control module 162 may receive the determined hysteresis gain and the compensated current $I_C$ from the current transformation module 158. In other words, the current control module 162 may apply a predetermined hysteresis to the compensated current $I_C$ according to the determined hysteresis gain to generate the transformed current $I_T$.

The current control module 162 may perform CCO of the solenoids in the transmission 36 using the transformed current $I_T$. The current control module 162 may perform CCO by introducing a dither to the transformed current $I_T$. For example, an amplitude of the dither may be based on the transmission oil temperature $T_O$. Moreover, a frequency and/or shape of the dither may be determined based on predetermined dither models.

Figure 6:
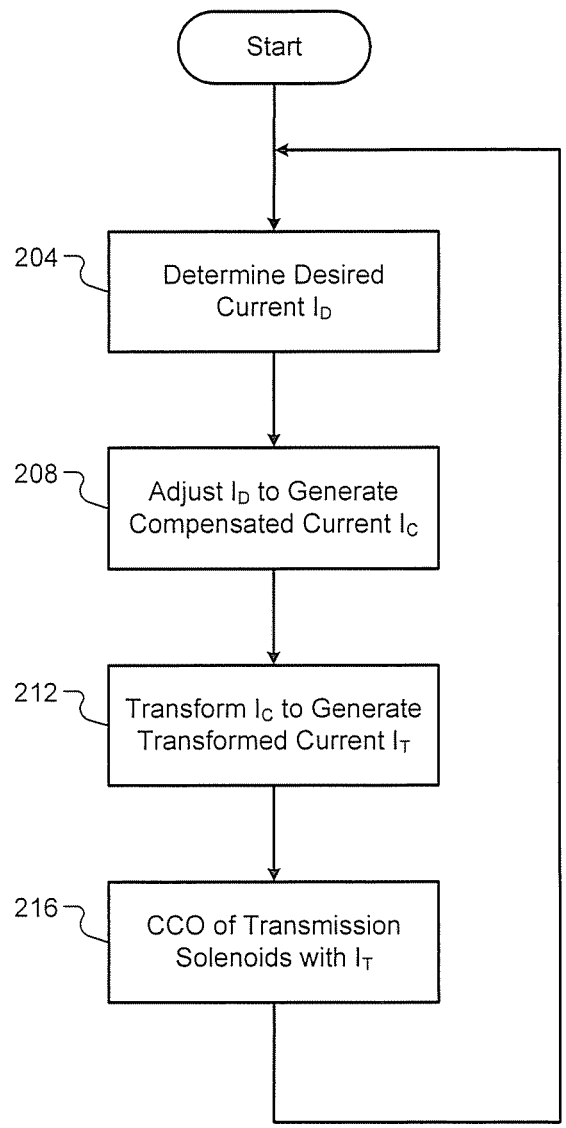
FIG. 6 is a flow diagram of an exemplary control method for transmission solenoids according to the present disclosure.

Referring now to FIG. 6, a control method for transmission solenoids begins in step 204. In step 204, the control module 40 may determine the desired current $I_D$ based on the desired pressure $P_D$ and the previous pressure $P_P$.

In step 208, the control module 40 may adjust the desired current $I_D$ based on the system pressure $P_E$ and the transmission oil temperature $T_O$, thus generating the compensated current $I_C$. In step 212, the control module 40 may transform (i.e., apply hysteresis to) the compensated current $I_C$ based on the desired pressure $P_D$ and the previous pressure $P_P$, thus generating the transformed current $I_T$.

In step 216, the control module 40 may perform CCO of the solenoids of the transmission 36 using the transformed current $I_T$. For example, performing CCO of the solenoids may include introducing a dither to the transformed current $I_T$. Control may then return to step 204, where the desired pressure $P_D$ from the completed cycle may be used as the previous pressure $P_P$ in the future cycle. For example, the desired pressure $P_D$ from previous cycle(s) may be stored in memory.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A current control output (CCO) system for transmission solenoids, comprising:
    a current determination module that determines a desired current for the solenoids based on a desired pressure;
    a current compensation module that generates a compensated current by adjusting the desired current based on a system pressure and a temperature of oil in the transmission;
    a current transformation module that determines a hysteresis gain based on the desired pressure and a previous pressure, and that generates a transformed current by adjusting the compensated current based on the determined hysteresis gain; and
    a current control module that performs current-based control of the solenoids based on the transformed current.

2. The control system of claim 1, wherein the current transformation module includes a lookup table that includes a plurality of hysteresis gains relating to desired pressures and pressure steps, wherein the pressure steps each include a magnitude and a polarity of a difference between the desired pressure and the previous pressure.

3. The control system of claim 1, wherein the current control module performs current-based control of the solenoids based on the transformed current.

4. The control system of claim 3, wherein the current control module introduces a dither to the transformed current and performs current-based control of the solenoids based on the dithered, transformed current.

5. The control system of claim 4, wherein an amplitude of the dither is based on the temperature of the oil in the transmission and the transformed current, and wherein the frequency of the dither is based on predetermined dither models.

6. The control system of claim 1, wherein the current determination module includes first and second lookup tables that each include a plurality of desired currents relating to desired pressures, wherein the first lookup table is used when the desired pressure is greater than the previous pressure, and wherein the second lookup table is used when the desired pressure is less than the previous pressure.

7. A current control output (CCO) system for transmission solenoids, comprising:
    a current determination module that determines a desired current for the solenoids based on a desired pressure;
    a current compensation module that generates a compensated current by adjusting the desired current based on a system pressure and a temperature of oil in the transmission; and
    a current control module that performs current-based control of and applies hysteresis to the solenoids based on the compensated current, wherein the current compensation module includes a plurality of lookup tables, wherein each of the plurality of lookup tables include a plurality of current offsets relating to at least one of the system pressure and the temperature of the oil in the transmission.

8. The control system of claim 1, wherein the system pressure is one of estimated and measured using a pressure transducer in the transmission.

9. The control system of claim 1, wherein the current determination module, the current compensation module, and the current transformation module each include at least one lookup table that includes values based on a common parameter and a parameter that is unique to a manufacturer of the transmission.

10. A current control method for transmission solenoids, comprising:
    determining a desired current for the solenoids based on a desired pressure;
    generating a compensated current by adjusting the desired current based on a system pressure and a temperature of oil in the transmission;
    determining a hysteresis gain based on the desired pressure and a previous pressure;
    generating a transformed current by adjusting the compensated current based on the determined hysteresis gain; and
    performing current-based control of the solenoids based on the transformed current.

11. The method of claim 10 wherein the transformed current is generated using a lookup table that includes a plurality of hysteresis gains relating to desired pressures and pressure steps, wherein the pressure steps each include a magnitude and a polarity of a difference between the desired pressure and the previous pressure.

12. The method of claim 10, further comprising:
performing current-based control of the solenoids based on the transformed current.

13. The method of claim 12, further comprising:
introducing a dither to the transformed current; and
performing current-based control of the solenoids based on the dithered, transformed current.

14. The method of claim 13, wherein an amplitude of the dither is based on the temperature of the oil in the transmission and the transformed current, and wherein the frequency of the dither is based on predetermined dither models.

15. The method of claim 10, wherein the desired current is determined using one of first and second lookup tables that each include a plurality of desired currents relating to desired pressures, wherein the first lookup table is used when the desired pressure is greater than the previous pressure, and wherein the second lookup table is used when the desired pressure is less than the previous pressure.

16. A current control method for transmission solenoids, comprising:
determining a desired current for the solenoids based on a desired pressure;
generating a compensated current by adjusting the desired current based on a system pressure and a temperature of oil in the transmission; and
performing current-based control of and applying hysteresis to the solenoids based on the compensated current, wherein the compensated current is generated using at least one of a plurality of lookup tables, wherein each of the plurality of lookup tables include a plurality of current offsets relating to at least one of the system pressure and the temperature of the oil in the transmission.

17. The method of claim 10, wherein the system pressure is one of estimated and measured using a pressure transducer in the transmission.

18. The method of claim 10, wherein each of the desired current, the compensated current, and the transformed current are generated using at least one lookup table that includes values based on a common parameter and a parameter that is unique to a manufacturer of the transmission.

19. The control system of claim 1, wherein the current transformation module determines the hysteresis gain based on a magnitude and a polarity of a difference between the desired pressure and the previous pressure.

20. The method of claim 10, further comprising determining the hysteresis gain based on a magnitude and a polarity of a difference between the desired pressure and the previous pressure.

* * * * *